United States Patent [19]

Schwerdhöfer et al.

[11] Patent Number: 4,820,979
[45] Date of Patent: Apr. 11, 1989

[54] ELECTRONIC INSTRUMENT UNIT FOR USE ON A BICYCLE HAVING A SIGNAL RECEIVER ON BOTH SIDES OF THE UNIT

[75] Inventors: Hans J. Schwerdhöfer, Schweinfurt; Johannes Jäger, Gochsheim; Richard Gerstner, Dittelbrunn; Günter Look, Bergrheinfeld, all of Fed. Rep. of Germany

[73] Assignee: Sachs-Huret S.A., Nanterre, France

[21] Appl. No.: 120,376

[22] Filed: Nov. 13, 1987

[30] Foreign Application Priority Data

Nov. 20, 1986 [DE] Fed. Rep. of Germany ... 8631057[U]

[51] Int. Cl.$^4$ ............................................. G01P 3/487
[52] U.S. Cl. ........................... 324/171; 324/173; 324/174; 364/565
[58] Field of Search ............... 324/171, 173, 174, 166, 324/167, 168, 208; 73/493, 494; 361/240; 364/565; 340/963; D10/70, 103; D12/114

[56] References Cited

U.S. PATENT DOCUMENTS

| 3,893,023 | 7/1975 | Febvre et al. | 324/72.5 |
| 3,898,563 | 8/1975 | Erisman | 324/174 |
| 4,071,892 | 1/1978 | Genzling | 73/493 |
| 4,156,190 | 5/1979 | Chittenden et al. | 324/168 |
| 4,331,918 | 5/1982 | Durch | 324/174 |
| 4,352,063 | 9/1982 | Jones et aol. | 324/174 |
| 4,506,339 | 3/1985 | Kühnlein | 364/565 |

FOREIGN PATENT DOCUMENTS 3226357 1/1984 Fed. Rep. of Germany .

Primary Examiner—Reinhard J. Eisenzopf
Assistant Examiner—Maura K. Regan
Attorney, Agent, or Firm—Toren, McGeady & Associates

[57] ABSTRACT

The invention relates to an electronic instrument for use on a bicycle and intended to indicate to the bicycle operator measuring values like actual speed or actual distance covered by the bicycle. The electronic instrument is provided with two signal receiving components on both sides of the middle plane so that the instrument can be mounted on both sides of the respective wheel of the bicycle.

19 Claims, 1 Drawing Sheet

ELECTRONIC INSTRUMENT UNIT FOR USE ON A BICYCLE HAVING A SIGNAL RECEIVER ON BOTH SIDES OF THE UNIT

BACKGROUND OF THE INVENTION

Bicycles are frequently equipped with an electric instrument intended to show to the operator measuring values like the actual speed of the bicycle or the actual distance covered by the bicycle. These electronic instruments can be mounted on a leg of the fork-shaped carrier unit in which the respective wheel is rotatably mounted. The operator can see the relevant measuring value on a display unit provided on the instrument. Some people like to have the instrument on the left-hand side of the forward wheel, others want to have it on the right-hand side of the wheel.

STATEMENT OF THE PRIOR ART

An electronic instrument of the above defined type is known from German Pat. No. P 32 26 357. This known instrument is provided with a Reed-switch adjacent to one side wall of the instrument housing. This Reed-switch is to be actuated by a magnet fixed on a spoke of the respective wheel. The instrument can be mounted only on one side of the forward bicycle wheel such that the Reed-switch reliably responds to the magnet.

OBJECT OF THE INVENTION

It is the object of the present invention to provide an electronic instrument unit which can be used on both sides of the bicycle wheel.

SUMMARY OF THE INVENTION

In view of the above defined object an electronic instrument unit for use on a bicycle or the like comprises a frame unit having a middle plane. Fastening means are provided on said frame unit for fastening the frame unit on a fork-shaped carrier unit of the respective bicycle. A bicycle wheel is rotatably mounted about a wheel axis on the carrier unit. The wheel has a main plane perpendicular to the wheel axis. The middle plane of the frame unit is substantially parallel to the main plane of the wheel when the frame unit is fastened to the carrier unit. Electronic circuit means including signal-receiving means are provided on the frame unit. The signal-receiving means cooperate with signal-inducing means provided on the wheel such as to pass by said frame unit during rotation of the bicycle wheel and to cause signals to be delivered to the electronic circuit means. The signal-receiving means comprise at least one signal receiver component on both sides of the middle plane Due to the provision of signal receiver components on both sides of the middle plane the instrument may be provided on both sides of the wheel. This is even an advantage if the fastening means are adapted only for being mounted on one leg of the fork-shaped carrier unit, because the manufacturer can then equip one and the same frame unit alternatively with fastening means adapted to the left-hand leg and with fastening means adapted to the right-hand leg. Preferably, however, the fastening means are adapted for alternatively fastening the frame unit to each leg of the fork-shaped carrier unit. With such a design it is possible for the dealer or for the customer to fasten a completed electronic instrument alternatively on both sides of the bicycle wheel. It is desirable that the fastening means are substantially symmetrically with respect to the middle plane so that on whatever side of the wheel the instrument unit is arranged, the relative location of the respective receiver component with respect to the bicycle wheel is identical. For the same reason it is also desirable that the signal receiver components are arranged substantially symmetrically with respect to the middle plane.

In order to protect the various components of the instrument against external influence the frame unit should comprise a housing. Such a housing has two side walls opposite to each other in a direction transverse to said middle plane. The signal receiver components will be located adjacent to respective side walls and as close as possible to said side walls.

As a rule the bicycle wheels comprise two groups of spokes which are axially spaced at the radial inner ends thereof near the wheel axis. In view of this the inducing means may comprise at least one inducer element which is adapted for being alternatively fastened to a spoke of the one group or to a spoke of the other group in response to the positioning of the instrument on the one side or the other side of the bicycle wheel. The instrument unit can comprise measuring value read-out means integrated into the instrument unit. These read-out means can for example be a display unit which shows to the operator the relevant measuring value even if he is sitting on the saddle of the bicycle. In order to allow the operator optimum view on the read-out means, irrespectively of the location of the instrument on the left side or the right side of the wheel, the read-out means should be arranged symmetrically with respect to the middle plane of the instrument.

The instrument may also comprise hand-controllable operating means which may be used for the reset of the read-out value or for selecting the display of various measuring values like speed and covered distance. It is desirable that also such operating means are arranged symmetrically with respect to the middle plane.

It is further desirable that the total external appearance of the instrument unit is symmetrical with respect to the middle plane.

In order to protect the valuable instrument against theft, it is desirable that the fastening means comprise a fastener unit for being fastened to said fork-shaped wheel carrier unit, said frame unit and said fastener unit having mating engagement faces for releasably fixing said frame unit on said fastener unit.

In order to obtain an optimum coupling between the signal receiver component and the inducing means, it is desirable that the frame unit and the fastening means are adapted in such a way to the design of the fork-shaped carrier unit and to the location of said signal-inducing means on said bicycle wheel that said inducing means pass with a gap of less than 20 mm, preferably less than 10 mm, most preferably less than 5 mm by the respective signal receiver component.

The signal receiver components may comprise a switch to be operated by approaching and removing a magnet. In such case the signal inducing means will comprise at least one magnet to be mounted on the wheel. In order to protect such a magnetically operable switch against external influence a Reed-switch may be used.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail below by reference to an example of embodiment. Individually.

DETAIL DESCRIPTION OF THE DRAWINGS

Figure 2:
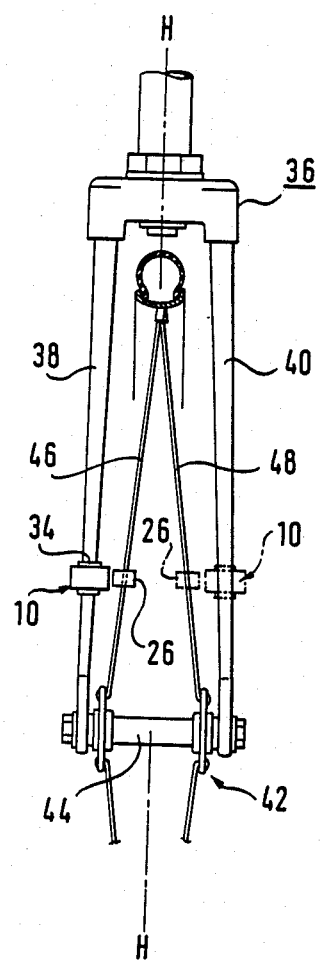
FIG. 2 shows a forward bicycle fork unit with a wheel and the instrument unit according to FIG. 1.
Figure 1:
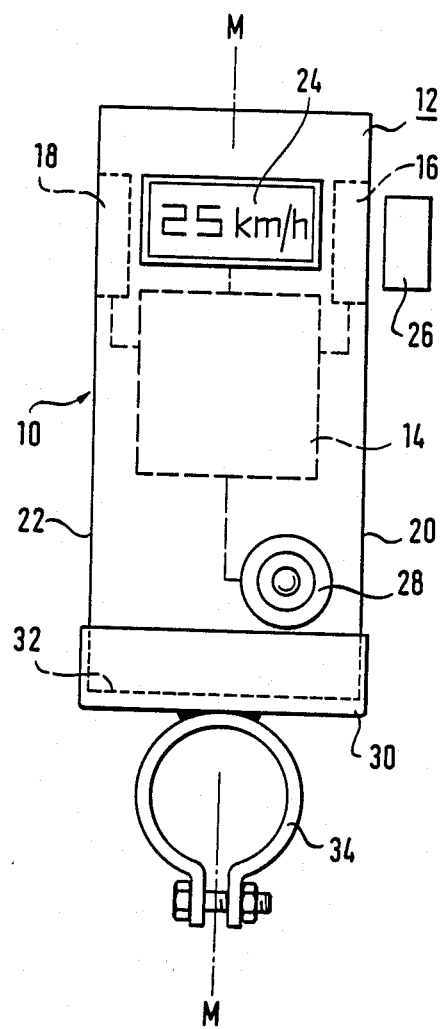
FIG. 1 shows a plane view of an instrument unit for fastening means.

In FIG. 1 the instrument unit is designated by 10. This instrument unit 10 comprises a frame 12 which is designed as a closed housing. In this housing there is provided an electronic circuitry 14 which comprises for example an amplifier, a pulse shaper, a calculator and a memory. The electronic circuitry 14 comprises two Reed-switches 16 and 18 on both side walls 20 and 22 of the frame. The Reed-switches 16, 18 are connected with the electronic circuitry. A read-out or display unit 24 is also connected to the electronic circuitry. The electronic circuitry 14 is fed with pulses coming from the one or the other Reed-switch 16, 18, respectively. The pulses are generated by opening and closing the Reed-switch. This opening and closing is effected by a magnet 26 mounted on a bicycle wheel and passing by the respective Reed-switch 16, 18. In the electronic circuitry measuring values are obtained in response to the pulses received and these measuring values, for example representing speed or covered distance, are displayed on the display unit 24. An operating button 28 allows to reset the measuring value displayed in the display unit and/or to select various measuring values. The housing 10 is fixed to a fastener unit 30 by mating engagement faces 32. The fastener unit 30 is provided with a clamping ring 34 to be mounted on a fork-shaped wheel carrier unit of the bicycle. This fork-shaped wheel carrier unit is shown in FIG. 2 and designated by 36. The fork-shaped wheel carrier unit 36 comprises two legs 38 and 40. The instrument unit 10 is fixed to the leg 38 as shown in full lines in FIG. 2. A bicycle wheel 42 is rotatably mounted on the fork-shaped wheel carrier unit 36 for rotation about a wheel axis 44. The bicycle wheel 42 comprises two groups of spokes 46 and 48. In FIG. 2 the magnet 26 is—as shown in full lines—provided on one of the spokes of group 46 so as to be close to the Reed-switch 18. As shown in dotted lines in FIG. 2 the instrument unit 10 may also be fastened to the leg 40, in which case the magnet 26 is fixed on a spoke of the group 48 such as to be close to the Reed-switch 16.

In FIG. 1 there is shown a middle plane M—M of the instrument. In FIG. 2 there is shown a main plane H—H of the bicycle wheel 42. The middle plane M—M is always parallel to the main plane H—H when the instrument unit 10 is fastened to one of the legs 38, 40.

The shape of the housing is not necessarily rectangular. The housing may also be shaped with convex side walls. It is, however, desirable that the form of the housing is symmetrical with respect to the middle plane M—M.

While specific embodiments of the invention have been shown and described in detail to illustrate the application of the inventive principles, it will be understood that the invention may be embodied otherwise without departing from such principles.

What is claimed is:

1. An electronic instrument unit for use on a wheeled vehicle having a carrier unit and a wheel rotatably mounted about a wheel axis on the carrier unit, the wheel having a main plane perpendicular to the wheel axis, comprising: a frame unit having a middle plane; fastening means on said frame unit for fastening said frame unit to the carrier unit of the vehicle so that said middle plane is substantially parallel to the main plane when said frame unit is fastened to the carrier unit; electronic circuit means including signal-receiving means provided on said frame unit; and signal-inducing means provided on the wheel so as to pass by said frame unit during rotation of the wheel, said signal-receiving means cooperating with said signal-inducing means to cause signals to be delivered to said electronic circuit means, said signal-receiving means including at least one signal receiver on each side of said middle plane.

2. An electronic instrument unit as defined in claim 1, wherein the carrier unit has a fork shape, said fastening means being adapted for alternatively fastening said frame unit to each leg of the fork-shaped carrier unit.

3. An electronic instrument unit as defined in claim 2, wherein said fastening means is arranged substantially symmetrical with respect to said middle plane.

4. An electronic instrument unit as defined in claim 1, wherein said at least one signal receiver is arranged substantially symmetrical with respect to said middle plane.

5. An electronic instrument unit as defined in claim 1, wherein said frame unit includes a housing having two side walls opposite one another in a direction transverse to said middle plane, said at least one signal receiver being located adjacent to said side walls.

6. An electronic instrument unit as defined in claim 1, wherein the wheel includes two groups of spokes axially spaced at radial inner ends thereof near the wheel axis, said signal-inducing means including at least one inducer element adapted so as to be alternatively fastenable to a spoke of one of the groups of spokes.

7. An electronic instrument unit as defined in claim 1; and further comprising measuring value read-out means.

8. An electronic instrument unit as defined in claim 1, wherein said read-out means includes a display unit.

9. An electronic instrument unit as defined in claim 8, wherein said read-out means is symmetrically arranged with respect to said middle plane.

10. An electronic instrument unit as defined in claim 1; and further comprising hand-controllable operating means symmetrically arranged with respect to said middle plane.

11. An electronic instrument unit as defined in claim 1, wherein said instrument unit has an external appearance symmetrical with respect to said middle plane.

12. An electronic instrument unit as defined in claim 1, wherein said fastening means includes a fastener unit provided so as to be fastenable to the wheel carrier unit, said frame unit land said fastener unit each having mating engagement faces so that said frame unit is releasably fixable on said fastener unit.

13. An electronic instrument unit as defined in claim 1, wherein said frame unit and said fastening means are provided in such a way with respect to the design of the carrier unit and the location of said signal-inducing means on the wheel so that said signal-inducing means passes by said at least one signal receiver with a gap of less than 20 millimeters.

14. An electronic instrument unit as defined in claim 13, wherein said gap is less than 10 millimeters.

15. An electronic instrument unit as defined in claim 14, wherein said gap is less than 5 millimeters.

16. An electronic instrument unit as defined in claim 1, wherein said at least one signal receiver includes a magnetically operable switch, said signal-inducing means including at least one magnet.

17. An electronic instrument unit as defined in claim 16, wherein said magnetically operable switch is reed-switch.

18. An electronic instrument unit as defined in claim 1, wherein the wheeled vehicle is a bicycle.

19. An electronic instrument unit and a bicycle, comprising, in combination: a fork-shaped bicycle wheel carrier unit; a bicycle wheel axis on said carrier unit; a bicycle wheel rotatably mounted about said wheel axis, said wheel having a main plane perpendicular to said wheel axis; a frame unit having a middle plane; fastening means on said frame unit for fastening said frame unit on said fork-shaped wheel carrier unit, said middle plane being substantially parallel to said main plane when said frame unit is fastened to said fork-shaped carrier unit; electronic circuit means including signal-receiving means on said frame unit; signal-inducing means provided on said wheel so as to pass by said frame unit during rotation of said bicycle wheel, said signal-receiving means cooperating with said signal-inducing means so as to cause signals to be delivered to said electronic circuit means, said signal-receiving means including at least one signal receiver on each side of said middle plane.

* * * * *